(12) United States Patent
Hasegawa et al.

(10) Patent No.: US 11,335,955 B2
(45) Date of Patent: May 17, 2022

(54) NON-AQUEOUS ELECTROLYTE FOR LITHIUM ION SECONDARY BATTERY AND LITHIUM ION SECONDARY BATTERY USING SAME

(71) Applicant: TDK CORPORATION, Tokyo (JP)

(72) Inventors: Tomohiko Hasegawa, Tokyo (JP); Hirofumi Kakuta, Tokyo (JP); Yusuke Kume, Tokyo (JP)

(73) Assignee: TDK CORPORATION, Tokyo (JP)

( * ) Notice: Subject to any disclaimer, the term of this patent is extended or adjusted under 35 U.S.C. 154(b) by 205 days.

(21) Appl. No.: 16/495,569

(22) PCT Filed: Sep. 14, 2018

(86) PCT No.: PCT/JP2018/034090
§ 371 (c)(1),
(2) Date: Sep. 19, 2019

(87) PCT Pub. No.: WO2019/065288
PCT Pub. Date: Apr. 4, 2019

(65) Prior Publication Data
US 2020/0112060 A1    Apr. 9, 2020

(30) Foreign Application Priority Data

Sep. 26, 2017 (JP) .............................. JP2017-184834

(51) Int. Cl.
*H01M 4/00* (2006.01)
*H01M 10/0569* (2010.01)
(Continued)

(52) U.S. Cl.
CPC ......... *H01M 10/0569* (2013.01); *H01M 4/58* (2013.01); *H01M 10/0525* (2013.01);
(Continued)

(58) Field of Classification Search
CPC ....... H01M 2300/0054; H01M 4/5825; H01M 2300/0051; H01M 4/58; H01M 2004/028; Y02E 60/10
See application file for complete search history.

(56) References Cited

U.S. PATENT DOCUMENTS

| | | |
|---|---|---|
| 2003/0003358 A1 | 1/2003 | Mandal et al. |
| 2007/0287071 A1 | 12/2007 | Chiga et al. |

(Continued)

FOREIGN PATENT DOCUMENTS

| | | |
|---|---|---|
| CN | 103825049 A | 5/2014 |
| JP | 2008-140760 A | 6/2008 |

(Continued)

OTHER PUBLICATIONS

Dec. 11, 2018 Written Opinion of the International Searching Authority issued in International Patent Application No. PCT/2018/034090.

(Continued)

*Primary Examiner* — Cynthia H Kelly
*Assistant Examiner* — Monique M Wills
(74) *Attorney, Agent, or Firm* — Oliff PLC

(57) ABSTRACT

A non-aqueous electrolyte for a lithium ion secondary battery capable of improving rate characteristics, and the lithium ion secondary battery using the same. The non-aqueous electrolyte for the lithium ion secondary battery includes a carboxylic acid ester and $2.0 \times 10^{-6}$ to $3.0 \times 10^{-3}$ mol/L of halide ion other than fluoride ion.

12 Claims, 1 Drawing Sheet

(51) Int. Cl.
   *H01M 4/58* (2010.01)
   *H01M 10/0525* (2010.01)
   *H01M 4/02* (2006.01)

(52) U.S. Cl.
   CPC ............... *H01M 2004/027* (2013.01); *H01M 2004/028* (2013.01); *H01M 2300/0051* (2013.01); *H01M 2300/0054* (2013.01)

(56) References Cited

U.S. PATENT DOCUMENTS

| | | | |
|---|---|---|---|
| 2009/0136838 A1 | 5/2009 | Abe et al. | |
| 2013/0143129 A1* | 6/2013 | Okamoto | H01M 10/056 429/338 |
| 2014/0011098 A1 | 1/2014 | Jeon et al. | |
| 2014/0141325 A1 | 5/2014 | Yu et al. | |
| 2019/0006713 A1 | 1/2019 | Takahashi et al. | |
| 2019/0273257 A1* | 9/2019 | Siu | H01M 4/623 |

FOREIGN PATENT DOCUMENTS

| | | |
|---|---|---|
| JP | 2009-129719 A | 6/2009 |
| JP | 2009-164052 A | 7/2009 |
| JP | 2009-301954 A | 12/2009 |
| JP | 2015-92476 A | 5/2015 |
| JP | 2016-85837 A | 5/2016 |
| JP | 2017-82303 A | 5/2017 |
| JP | 2017-152126 A | 8/2017 |
| KR | 10-2013-0118809 A | 10/2013 |
| WO | 2009/084928 A2 | 7/2009 |
| WO | 2017/065145 A1 | 4/2017 |
| WO | 2018/179884 A1 | 10/2018 |

OTHER PUBLICATIONS

Dec. 11, 2018 Search Report issued in International Patent Application No. PCT/JP2018/034090.

Jul. 28, 2020 Office Action issued in Japanese Patent Application No. 2019-544575.

\* cited by examiner

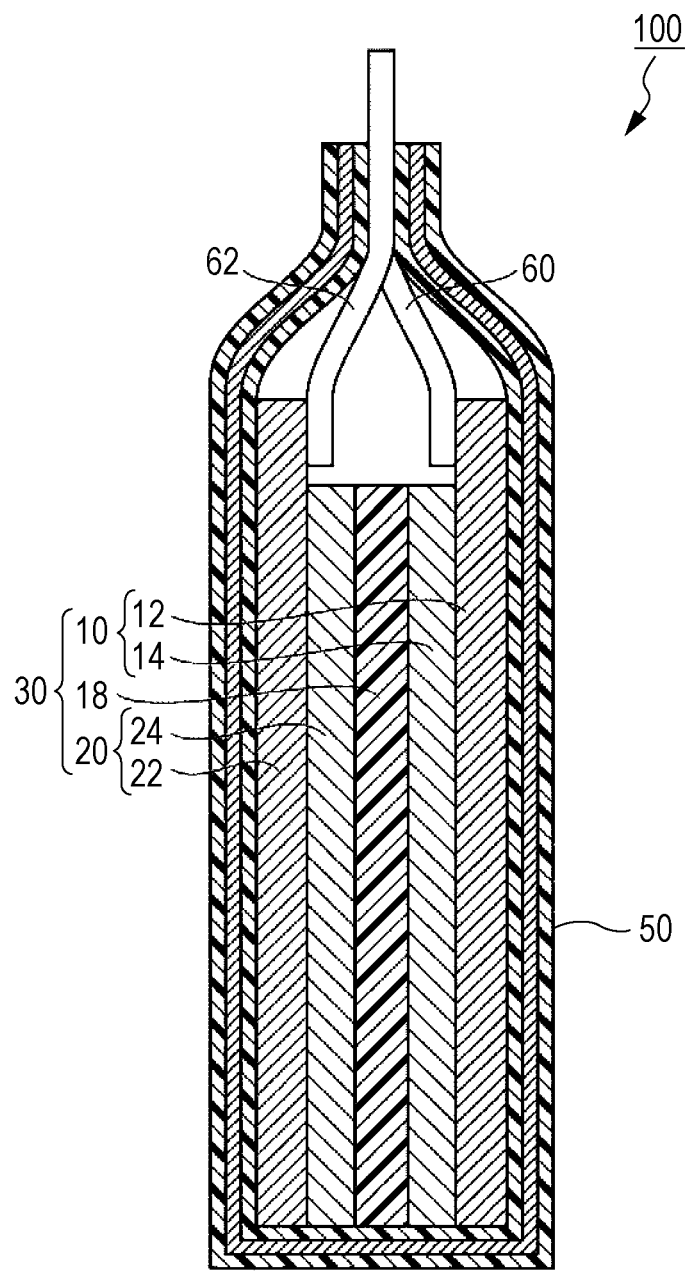

NON-AQUEOUS ELECTROLYTE FOR LITHIUM ION SECONDARY BATTERY AND LITHIUM ION SECONDARY BATTERY USING SAME

TECHNICAL FIELD

The present invention relates to a non-aqueous electrolyte for a lithium ion secondary battery, and the lithium ion secondary battery using the same.

BACKGROUND

In recent years, miniaturization and wireless technology of electronic devices such as mobile phones and personal computers are rapidly advancing, and a demand for secondary batteries having small size, light weight, and high energy density is increasing as power sources for driving them. Further, under such circumstances, the lithium ion secondary battery having large charge and discharge capacity and high energy density has attracted attention.

The electrolyte for the lithium ion secondary battery is made of lithium salt which is the electrolyte, and a non-aqueous organic solvent. The non-aqueous organic solvent is required to have a high dielectric constant to dissociate the lithium salt, to exhibit high ionic conductivity in a wide temperature range, and to be stable in the battery. Since it is difficult to achieve these requirements with one solvent, it is usually common to combine, for use, a high dielectric constant solvent typified by propylene carbonate, ethylene carbonate, or the like with a low viscosity solvent such as dimethyl carbonate and diethyl carbonate.

It is very useful to reduce viscosity of the electrolyte in increasing output of the lithium ion secondary battery. For example, there is a solvent called carboxylic acid ester as one of low viscosity solvents, and a technique for improving output characteristics particularly at low temperatures when the solvent is used has been reported. (PATENT LITERATURE 1)

CITATION LIST

Patent Literature

PATENT LITERATURE 1: JP-A-2009-129719

SUMMARY OF THE INVENTION

Problems to be Solved by the Invention

However, methods of typical techniques still do not satisfy various characteristics, and further improvement of rate characteristics is required.

The present invention has been made in view of problems of the above typical techniques, and an object of the present invention is to provide the non-aqueous electrolyte for the lithium ion secondary battery capable of improving the rate characteristics, and the lithium ion secondary battery using the same.

Solution to the Problems

In order to solve the above problems, a non-aqueous electrolyte for a lithium ion secondary battery according to the present invention contains a carboxylic acid ester and $2.0 \times 10^{-6}$ to $3.0 \times 10^{-3}$ mol/L of halide ion other than fluoride ion.

According to this, halogen having an electronegativity lower than that of fluorine is incorporated into SEI to be reduced in donor ability, so that lithium ions in the SEI can move quickly into the electrolyte by solvation in discharge. This improves the rate characteristics.

The non-aqueous electrolyte for the lithium ion secondary battery according to the present invention preferably further contains a halogenated cyclic carbonate represented by the following chemical formula (1).
(where $X_1$ and $X_2$ represent halogen excluding fluorine or hydrogen, provided that one of $X_1$ and $X_2$ is halogen excluding fluorine)

[Chemical formula 1]

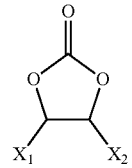

(1)

According to this, in addition to the fact that the halogenated cyclic carbonate represented by the chemical formula (1) forms a good SEI on the negative electrode to suppress reductive decomposition of the carboxylic acid ester, the halogen having the electronegativity lower than that of fluorine is incorporated into a solid electrolyte membrane (SEI) of the negative electrode to be reduced in donor ability, so that the lithium ions in the SEI can move quickly into the electrolyte by solvation in discharge. This improves the rate characteristics.

In the non-aqueous electrolyte for the lithium ion secondary battery according to the present invention, the electrolyte preferably further contains $1.0 \times 10^{-6}$ to $3.0 \times 10^{-3}$ mol/L of the halogenated cyclic carbonate.

According to this, the above content of the halogenated cyclic carbonate is suitable, and the rate characteristics are further improved.

Further, in the non-aqueous electrolyte for the lithium ion secondary battery according to the present invention, the carboxylic acid ester is preferably represented by the following chemical formula (2).
(where $R_1$ and $R_2$ each represents a linear or branched alkyl group or a substituted alkyl group having 1 to 4 carbon atoms, and a total number of carbon atoms of $R_1$ and $R_2$ is 5 or less.)

[Chemical formula 2]

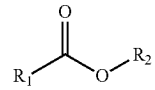

(2)

According to this, the carboxylic acid ester is suitable, and the rate characteristics are further improved.

Further, in the non-aqueous electrolyte for the lithium ion secondary battery according to the present invention, the carboxylic acid ester is preferably propionic acid ester or acetic acid ester.

According to this, propionic acid ester or acetic acid ester is suitable as the carboxylic acid ester, and the rate characteristics are further improved.

In the non-aqueous electrolyte for the lithium ion secondary battery according to the present invention, the halide ion other than the fluoride ion is preferably a chloride ion.

According to this, the chloride ion is suitable as the halide ion, and the rate characteristics are further improved.

A lithium ion secondary battery according to the present invention includes a positive electrode, a negative electrode, a separator positioned between the positive electrode and the negative electrode, and the non-aqueous electrolyte for the lithium ion secondary battery.

Further, in the lithium ion secondary battery according to the present invention, the positive electrode preferably contains a lithium vanadium compound.

Further, in the lithium ion secondary battery according to the present invention, the lithium vanadium compound is preferably $LiVOPO_4$.

Effects of the Invention

According to the present invention, provided are the non-aqueous electrolyte for the lithium ion secondary battery capable of improving the rate characteristics, and the lithium ion secondary battery using the same.

BRIEF DESCRIPTION OF THE DRAWINGS

FIG. 1 is a schematic cross-sectional view of a lithium ion secondary battery of the present embodiment.

DESCRIPTION OF THE EMBODIMENTS

Hereinafter, preferred embodiments according to the present invention will be described with reference to the drawings. Note that the present invention is not limited to the following embodiments. Further, components described below include those which can be easily conceived by those skilled in the art and those substantially the same. Furthermore, the components described below can be combined as appropriate.

<Lithium Ion Secondary Battery>

As shown in FIG. 1, a lithium ion secondary battery 100 according to the present embodiment includes: a stacked body 30 including a plate-like negative electrode 20 and a plate-like positive electrode 10 facing each other, and a plate-like separator 18 disposed between the negative electrode 20 and the positive electrode 10; a case 50 for accommodating these in a sealed state with an electrolytic solution containing lithium ions; a lead 62 having one end electrically connected to the negative electrode 20 and the other end projecting outside the case; and a lead 60 having one end electrically connected to the positive electrode 10 and the other end projecting outside the case.

The positive electrode 10 has a positive electrode current collector 12 and a positive electrode active material layer 14 formed on the positive electrode current collector 12. Further, the negative electrode 20 has a negative electrode current collector 22 and a negative electrode active material layer 24 formed on the negative electrode current collector 22. The separator 18 is located between the negative electrode active material layer 24 and the positive electrode active material layer 14.

<Positive Electrode>

(Positive Electrode Current Collector)

The positive electrode current collector 12 may be any conductive plate material, and for example, aluminum or an alloy thereof, or a thin metal plate (metal foil) such as stainless steel can be used.

(Positive Electrode Active Material Layer)

The positive electrode active material layer 14 is mainly made of a positive electrode active material, a positive electrode binder, and a positive electrode conductive auxiliary agent.

(Positive Electrode Active Material)

The positive electrode active material is not particularly limited as long as it can reversibly advance absorption and release of lithium ions, desorption and insertion (intercalation) of lithium ions, or doping and dedoping of counter anions (for example, $PF_6^-$) of the lithium ions, and a known electrode active material can be used. Examples of the positive electrode active material include lithium cobaltate ($LiCoO_2$), lithium nickelate ($LiNiO_2$), lithium manganese spinel ($LiMn_2O_4$), a composite metal oxide represented by chemical formula: $LiNi_xCo_yMn_zMaO_2$ (x+y+z+a=1, 0≤x≤1, 0≤y≤1, 0≤z≤1, 0≤a≤1, M is one or more elements selected from Al, Mg, Nb, Ti, Cu, Zn and Cr), a lithium vanadium compound $Li_a(M)_b(PO_4)_c$ (where M=VO or V, and 0.9≤a≤3.3, 0.9≤b≤2.2, 0.9≤c≤3.3), olivine type $LiMPO_4$ (where M represents one or more elements or VO selected from Co, Ni, Mn, Fe, Mg, Nb, Ti, Al, and Zr), and composite metal oxides such as lithium titanate ($Li_4Ti_5O_{12}$) and $LiNi_xCo_yAl_zO_2$ (0.9<x+y+z<1.1).

When the lithium vanadium compound is used among the above positive electrode active materials, an effect of improving cycle characteristics is strongly obtained in combination with the negative electrode and an electrolyte according to the present embodiment. The effect of improving cycle characteristics can be obtained more strongly, particularly with $LiVOPO_4$ among the lithium vanadium compounds. Although exact mechanism of the above-mentioned action is still unknown, it is thought that vanadium ions eluted from the lithium vanadium compound migrate to the negative electrode and are involved in formation of a good SEI.

(Binder for Positive Electrode)

The positive electrode binder bonds the positive electrode active materials to each other, and also bonds the positive electrode active material layer 14 and the positive electrode current collector 12. The binder may be any one as long as the above-mentioned bonding is possible, and for example, a fluorine resin such as polyvinylidene fluoride (PVDF) and polytetrafluoroethylene (PTFE), cellulose, styrene butadiene rubber, ethylene propylene rubber, polyimide resin, or polyamide imide resin may be used. Further, an electron conductive polymer or an ion conductive polymer may be used as the binder. Examples of the electron conductive polymer include polyacetylene, polythiophene, and polyaniline. Examples of the ion conductive polymer include those obtained by complexing a polyether-based polymer compound such as polyethylene oxide and polypropylene oxide with a lithium salt such as $LiClO_4$, $LiBF_4$, and $LiPF_6$.

Content of the binder in the positive electrode active material layer 14 is not particularly limited; however, it is preferably 0.5 to 5 parts by mass based on mass of the positive electrode active material if added.

(Positive Electrode Conductive Auxiliary Agent)

The positive electrode conductive auxiliary agent is not particularly limited as long as it improves conductivity of the positive electrode active material layer 14, and a known conductive auxiliary agent can be used. Examples of the positive electrode conductive auxiliary agent include carbon-based materials such as graphite and carbon black, metal fine powders such as copper, nickel, stainless steel, and iron, and conductive oxides such as ITO.

<Negative Electrode>
(Negative Electrode Current Collector)

The negative electrode current collector 22 may be any conductive plate material, and for example, the thin metal plate (metal foil) such as copper can be used.
(Negative Electrode Active Material Layer)

The negative electrode active material layer 24 is mainly made of a negative electrode active material, a negative electrode binder, and a negative electrode conductive auxiliary agent.
(Negative Electrode Active Material)

The negative electrode active material is not particularly limited as long as it can reversibly advance absorption and release of lithium ions, or desorption and insertion (intercalation) of lithium ions, and the known electrode active material can be used. Examples of the negative electrode active material include carbon-based materials such as graphite and hard carbon, silicon-based materials such as silicon oxide ($SiO_x$) and metal silicon (Si), metal oxides such as lithium titanate (LTO), and metal materials such as lithium, tin, and zinc.
(Negative Electrode Binder)

The negative electrode binder is not particularly limited, and the same one as the positive electrode binder described above can be used.
(Negative Electrode Conductive Auxiliary Agent)

The negative electrode conductive auxiliary agent is not particularly limited, and the same one as the positive electrode conductive auxiliary agent described above can be used.
<Electrolyte>

The electrolyte according to the present embodiment contains a carboxylic acid ester and $2.0 \times 10^{-6}$ to $3.0 \times 10^{-3}$ mol/L of halide ion other than fluoride ion.

According to this, halogen having an electronegativity lower than that of fluorine is incorporated into SEI to be reduced in donor ability, so that the lithium ions in the SEI can move quickly into the electrolyte by solvation in discharge. This improves the rate characteristics.

The electrolyte according to the present embodiment preferably further contains a halogenated cyclic carbonate represented by the following chemical formula (1).

[Chemical formula 3]

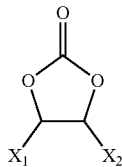

(1)

According to this, in addition to the fact that the halogenated cyclic carbonate represented by the chemical formula (1) forms a good SEI on the negative electrode to suppress reductive decomposition of the carboxylic acid ester, the halogen having the electronegativity lower than that of fluorine is incorporated into the SEI to be reduced in donor ability, so that the lithium ions in the SEI can move quickly into the electrolyte by solvation in discharge. This improves the rate characteristics.

In the electrolyte according to the present embodiment, the electrolyte preferably further contains $1.0 \times 10^{-6}$ to $3.0 \times 10^{-3}$ mol/L of the halogenated cyclic carbonate.

According to this, the above content of the halogenated cyclic carbonate is suitable, and the rate characteristics are further improved.

Further, in the electrolyte according to the present embodiment, the carboxylic acid ester is preferably represented by the following chemical formula (2), and more preferably propionic acid ester or acetic acid ester.

[Chemical formula 4]

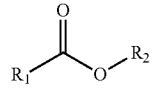

(2)

According to this, the carboxylic acid ester is suitable, and the rate characteristics are further improved.

Further, in the electrolyte according to the present embodiment, the carboxylic acid ester is preferably contained in the electrolyte in an amount of 50% by volume or more and 90% by volume or less.

According to this, the above ratio of carboxylic acid ester is suitable, and the rate characteristics are further improved.

Further, in the electrolyte according to the present invention, the halide ion other than the fluoride ion is preferably a chloride ion.

According to this, the chloride ion is suitable as the halide ion, and the rate characteristics are further improved.
(Other Solvents)

The electrolyte according to the present embodiment can use a solvent generally used for the lithium ion secondary battery other than the carboxylic acid ester. The solvent is not particularly limited, and for example, cyclic carbonate compounds such as ethylene carbonate (EC) and propylene carbonate (PC), linear carbonate compounds such as diethyl carbonate (DEC) and ethyl methyl carbonate (EMC), and the like can be mixed and used in any ratio.
(Electrolyte)

The electrolyte is not particularly limited as long as it is the lithium salt used as the electrolyte of the lithium ion secondary battery, and for example, inorganic acid anion salts such as $LiPF_6$, $LiBF_4$ and lithium bis(oxalate)borate, or organic acid anion salts such as $LiCF_3SO_3$, $(CF_3SO_2)_2NLi$ and $(FSO_2)_2NLi$ can be used.

Although the preferred embodiment according to the present invention has been described, the present invention is not limited to the above embodiment.

EXAMPLES

Hereinafter, the present invention will be more specifically described based on Examples and Comparative Examples; however, the present invention is not limited to the following examples.

Example 1

(Preparation of Positive Electrode)

50 parts by mass of $LiVOPO_4$ as the lithium vanadium compound, 35 parts by mass of $Li(Ni_{0.80}Co_{0.15}Al_{0.05})O_2$ as a lithium nickel compound, 5 parts by mass of carbon black, and 10 parts by mass of PVDF were dispersed in N-methyl-2-pyrrolidone (NMP), to prepare a slurry for forming the positive electrode active material layer. The slurry was applied to one side of an aluminum metal foil having a thickness of 20 μm so that a coating amount of the positive electrode active material was 9.0 mg/cm$^2$, and dried at 100° C. to form the positive electrode active material layer. Thereafter, it was pressure-molded by a roller press, to prepare the positive electrode.

(Preparation of Negative Electrode)

90 parts by mass of natural graphite, 5 parts by mass of carbon black, and 5 parts by mass of PVDF were dispersed in N-methyl-2-pyrrolidone (NMP), to prepare the slurry for forming the negative electrode active material layer. The slurry was applied to one side of a copper foil having a thickness of 20 µm so that the coating amount of the negative electrode active material was 6.0 mg/cm$^2$, and dried at 100° C. to form the negative electrode active material layer. Thereafter, it was pressure-molded by the roller press, to prepare the negative electrode.

(Preparation of Electrolyte)

A solution was prepared so that a composition ratio of EC:(ethyl propionate)=30:70 in volume ratio using ethyl propionate as the carboxylic acid ester, and LiPF$_6$ was dissolved therein to have a concentration of 1.0 mol/L. 4-Chloro-1,3-dioxolan-2-one as the halogenated carbonate was added to the above solution so as to be 1.0×10$^{-6}$ mol/L, to prepare the electrolyte.

(Preparation of Lithium Ion Secondary Battery for Evaluation)

The positive electrode and the negative electrode prepared above, and the separator made of a polyethylene microporous film interposed therebetween were placed in an aluminum laminate pack. After the electrolyte prepared above was injected into the aluminum laminate pack, vacuum sealing was performed to prepare the lithium ion secondary battery for evaluation.

(Measurement of 5 C Rate Characteristics)

For the lithium ion secondary battery for evaluation prepared above, using a secondary battery charge and discharge test device (manufactured by Hokuto Denko Corporation), the battery was charged until a battery voltage reached 4.2 V by constant current charge at a charge rate of 0.2 C (current value at which the charging ends in 5 hours when the constant current charge is performed at 25° C.), and was then discharged until the battery voltage reached 2.8 V by constant current discharge at a discharge rate of 0.2 C, to determine an initial discharge capacity $C_1$. Subsequently, the battery was charged until the battery voltage reached 4.2 V by the constant current charge at the charge rate of 1 C (current value at which the charging ends in 1 hour when the constant current charge is performed at 25° C.), and was then discharged until the battery voltage reached 2.8 V by the constant current discharge at the discharge rate of 5 C (current value at which the charging ends in 0.2 hours when the constant current charge is performed at 25° C.), to determine a 5 C discharge capacity $C_2$.

From the initial discharge capacity $C_1$ and 5 C discharge capacity $C_2$ determined above, the 5 C rate characteristics were determined according to the following equation. Obtained results are shown in Table 1.

5 Crate characteristics [%]=$C_2/C_1$×100

Example 2

The lithium ion secondary battery for evaluation of Example 2 was prepared in the same manner as Example 1, except that an additional amount of the halogenated carbonate used in preparation of the electrolyte was changed as shown in Table 1.

Example 3

The lithium ion secondary battery for evaluation of Example 3 was prepared in the same manner as Example 1, except that the additional amount of the halogenated carbonate used in the preparation of the electrolyte was changed as shown in Table 1.

Example 4

The lithium ion secondary battery for evaluation of Example 4 was prepared in the same manner as Example 1, except that the additional amount of the halogenated carbonate used in the preparation of the electrolyte was changed as shown in Table 1.

Example 5

The lithium ion secondary battery for evaluation of Example 5 was prepared in the same manner as Example 1, except that the additional amount of the halogenated carbonate used in the preparation of the electrolyte was changed as shown in Table 1.

Example 6

The lithium ion secondary battery for evaluation of Example 6 was prepared in the same manner as Example 1, except that the halogenated carbonate used in the preparation of the electrolyte was changed as shown in Table 1.

Example 7

The lithium ion secondary battery for evaluation of Example 7 was prepared in the same manner as Example 6, except that the additional amount of the halogenated carbonate used in the preparation of the electrolyte was changed as shown in Table 1.

Example 8

The lithium ion secondary battery for evaluation of Example 8 was prepared in the same manner as Example 6, except that the additional amount of the halogenated carbonate used in the preparation of the electrolyte was changed as shown in Table 1.

Example 9

The lithium ion secondary battery for evaluation of Example 9 was prepared in the same manner as Example 1, except that the halogenated carbonate used in the preparation of the electrolyte was changed as shown in Table 1.

Example 10

The lithium ion secondary battery for evaluation of Example 10 was prepared in the same manner as Example 9, except that the additional amount of the halogenated carbonate used in the preparation of the electrolyte was changed as shown in Table 1.

Example 11

The lithium ion secondary battery for evaluation of Example 11 was prepared in the same manner as Example 9, except that the additional amount of the halogenated carbonate used in the preparation of the electrolyte was changed as shown in Table 1.

Example 12

The lithium ion secondary battery for evaluation of Example 12 was prepared in the same manner as Example 1, except that the halogenated carbonate used in the preparation of the electrolyte was changed as shown in Table 1.

Example 13

The lithium ion secondary battery for evaluation of Example 13 was prepared in the same manner as Example 12, except that the additional amount of the halogenated carbonate used in the preparation of the electrolyte was changed as shown in Table 1.

Example 14

The lithium ion secondary battery for evaluation of Example 14 was prepared in the same manner as Example 12, except that the additional amount of the halogenated carbonate used in the preparation of the electrolyte was changed as shown in Table 1.

Example 15

The lithium ion secondary battery for evaluation of Example 15 was prepared in the same manner as Example 2, except that the carboxylic acid ester used in the preparation of the electrolyte was changed as shown in Table 1.

Example 16

The lithium ion secondary battery for evaluation of Example 16 was prepared in the same manner as Example 2, except that the carboxylic acid ester used in the preparation of the electrolyte was changed as shown in Table 1.

Example 17

The lithium ion secondary battery for evaluation of Example 17 was prepared in the same manner as Example 2, except that the carboxylic acid ester used in the preparation of the electrolyte was changed as shown in Table 1.

Example 18

The lithium ion secondary battery for evaluation of Example 18 was prepared in the same manner as Example 2, except that the composition ratio of the electrolyte was changed as shown in Table 1.

Example 19

The lithium ion secondary battery for evaluation of Example 19 was prepared in the same manner as Example 2, except that the composition ratio of the electrolyte was changed as shown in Table 1.

Example 20

The lithium ion secondary battery for evaluation of Example 20 was prepared in the same manner as Example 2, except that the composition ratio of the electrolyte was changed as shown in Table 1.

Example 21

The lithium ion secondary battery for evaluation of Example 21 was prepared in the same manner as Example 2, except that the composition ratio of the electrolyte was changed as shown in Table 1.

Example 22

The lithium ion secondary battery for evaluation of Example 22 was prepared in the same manner as Example 2, except that the carboxylic acid ester used in the preparation of the electrolyte was changed as shown in Table 1.

Example 23

The lithium ion secondary battery for evaluation of Example 23 was prepared in the same manner as Example 2, except that the carboxylic acid ester used in the preparation of the electrolyte was changed as shown in Table 1.

Example 24

The lithium ion secondary battery for evaluation of Example 24 was prepared in the same manner as Example 2, except that the carboxylic acid ester used in the preparation of the electrolyte was changed as shown in Table 1.

Example 25

The lithium ion secondary battery for evaluation of Example 25 was prepared in the same manner as Example 2, except that the carboxylic acid ester used in the preparation of the electrolyte was changed as shown in Table 1.

Example 26

The lithium ion secondary battery for evaluation of Example 26 was prepared in the same manner as Example 2, except that the carboxylic acid ester used in the preparation of the electrolyte was changed as shown in Table 1.

Example 27

The lithium ion secondary battery for evaluation of Example 27 was prepared in the same manner as Example 23, except that the composition ratio of the electrolyte was changed as shown in Table 1.

Example 28

The lithium ion secondary battery for evaluation of Example 28 was prepared in the same manner as Example 23, except that the composition ratio of the electrolyte was changed as shown in Table 1.

Example 29

The lithium ion secondary battery for evaluation of Example 29 was prepared in the same manner as Example 23, except that the composition ratio of the electrolyte was changed as shown in Table 1.

Example 30

The lithium ion secondary battery for evaluation of Example 30 was prepared in the same manner as Example 23, except that the composition ratio of the electrolyte was changed as shown in Table 1.

Example 31

The lithium ion secondary battery for evaluation of Example 31 was prepared in the same manner as Example 2, except that the carboxylic acid ester used in the preparation of the electrolyte was changed as shown in Table 1.

Example 32

The lithium ion secondary battery for evaluation of Example 32 was prepared in the same manner as Example 2, except that the carboxylic acid ester used in the preparation of the electrolyte was changed as shown in Table 1.

Example 33

The lithium ion secondary battery for evaluation of Example 33 was prepared in the same manner as Example 2, except that the carboxylic acid ester used in the preparation of the electrolyte was changed as shown in Table 1.

Example 34

The lithium ion secondary battery for evaluation of Example 34 was prepared in the same manner as Example 2, except that the lithium vanadium compound used in the preparation of the positive electrode was changed as shown in Table 1.

Example 35

The lithium ion secondary battery for evaluation of Example 35 was prepared in the same manner as Example 2, except that the lithium vanadium compound used in the preparation of the positive electrode was changed as shown in Table 1.

Comparative Example 1

The lithium ion secondary battery for evaluation of Comparative Example 1 was prepared in the same manner as Example 1, except that the halogenated carbonate was not added in the preparation of the electrolyte.

Comparative Example 2

The lithium ion secondary battery for evaluation of Comparative Example 2 was prepared in the same manner as Example 2, except that the composition ratio of the electrolyte was changed as shown in Table 1 without using the carboxylic acid ester.

Comparative Example 3

The lithium ion secondary battery for evaluation of Comparative Example 3 was prepared in the same manner as Example 2, except that the composition ratio of the electrolyte was changed as shown in Table 1 without using the carboxylic acid ester.

Comparative Example 4

The lithium ion secondary battery for evaluation of Comparative Example 4 was prepared in the same manner as Example 34, except that the halogenated carbonate was not added in the preparation of the electrolyte.

Comparative Example 5

The lithium ion secondary battery for evaluation of Comparative Example 5 was prepared in the same manner as Example 35, except that the halogenated carbonate was not added in the preparation of the electrolyte.

The 5 C rate characteristics of the lithium ion secondary batteries for evaluation prepared in Examples 2 to 35 and Comparative Examples 1 to 5 were measured in the same manner as in Example 1. The results are shown in Table 1.

In all of Examples 1 to 35, it was confirmed that a capacity retention rate after 300 cycles was improved as compared with Comparative Example 1 in which the halogenated carbonate was not added.

From the results of Examples 1 to 5, it was confirmed that the 5 C rate characteristics were further improved by optimizing the additional amount of the halogenated carbonate.

From the results of Examples 6 to 14, it was confirmed that the 5 C rate characteristics were further improved by using 4-Chloro-1,3-dioxolan-2-one or 4,5-Dichloro-1,3-dioxolan-2-one as the halogenated carbonate.

From the results of Examples 15 to 17 and Examples 22 to 26, it was confirmed that the 5 C rate characteristics were further improved by setting a total carbon number of the carboxylic acid to 5 or less.

From the results of Examples 18 to 21 and Examples 27 to 30, it was confirmed that the 5 C rate characteristics were further improved by optimizing the composition of the electrolyte.

From the results of Examples 31 to 33, it was confirmed that the 5 C rate characteristics were further improved by using propionic acid ester or acetic acid ester as the carboxylic acid ester.

From the results of Examples 34 to 35 and Comparative Examples 4 to 5, it was confirmed that the capacity retention after 300 cycles was further improved when $LiVOPO_4$ was used as the lithium vanadium compound.

TABLE 1

| | | Electrolyte | | |
| --- | --- | --- | --- | --- |
| | Halogenated carbonate | Additional amount of halogenated carbonate [mol/L] | Content of halide other than fluoride [mol/L] | Carboxylic acid ester (X) |
| Example 1 | 4-Chloro-1,3-dioxolan-2-one | $1.0 \times 10^{-6}$ | $1.0 \times 10^{-6}$ | Ethyl propionate |
| Example 2 | 4-Chloro-1,3-dioxolan-2-one | $1.0 \times 10^{-5}$ | $1.0 \times 10^{-5}$ | Ethyl propionate |
| Example 3 | 4-Chloro-1,3-dioxolan-2-one | $1.0 \times 10^{-4}$ | $1.0 \times 10^{-4}$ | Ethyl propionate |
| Example 4 | 4-Chloro-1,3-dioxolan-2-one | $3.0 \times 10^{-3}$ | $3.0 \times 10^{-3}$ | Ethyl propionate |
| Example 5 | 4-Chloro-1,3-dioxolan-2-one | $3.1 \times 10^{-3}$ | $3.1 \times 10^{-3}$ | Ethyl propionate |
| Example 6 | 4,5-Dichloro-1,3-dioxolan-2-one | $1.0 \times 10^{-6}$ | $2.0 \times 10^{-6}$ | Ethyl propionate |
| Example 7 | 4,5-Dichloro-1,3-dioxolan-2-one | $1.0 \times 10^{-5}$ | $2.0 \times 10^{-5}$ | Ethyl propionate |
| Example 8 | 4,5-Dichloro-1,3-dioxolan-2-one | $3.0 \times 10^{-3}$ | $6.0 \times 10^{-3}$ | Ethyl propionate |
| Example 9 | 4-Bromo-1,3-dioxolan-2-one | $1.0 \times 10^{-6}$ | $2.0 \times 10^{-6}$ | Ethyl propionate |
| Example 10 | 4-Bromo-1,3-dioxolan-2-one | $1.0 \times 10^{-5}$ | $2.0 \times 10^{-5}$ | Ethyl propionate |
| Example 11 | 4-Bromo-1,3-dioxolan-2-one | $3.0 \times 10^{-3}$ | $6.0 \times 10^{-3}$ | Ethyl propionate |

TABLE 1-continued

| | | | | |
|---|---|---|---|---|
| Example 12 | 4-Iodo-1,3-dioxolan-2-one | $1.0 \times 10^{-6}$ | $2.0 \times 10^{-6}$ | Ethyl propionate |
| Example 13 | 4-Iodo-1,3-dioxolan-2-one | $1.0 \times 10^{-5}$ | $2.0 \times 10^{-5}$ | Ethyl propionate |
| Example 14 | 4-Iodo-1,3-dioxolan-2-one | $3.0 \times 10^{-3}$ | $6.0 \times 10^{-3}$ | Ethyl propionate |
| Example 15 | 4-Chloro-1,3-dioxolan-2-one | $1.0 \times 10^{-5}$ | $2.0 \times 10^{-5}$ | Methyl propionate |
| Example 16 | 4-Chloro-1,3-dioxolan-2-one | $1.0 \times 10^{-5}$ | $2.0 \times 10^{-5}$ | Propyl propionate |
| Example 17 | 4-Chloro-1,3-dioxolan-2-one | $1.0 \times 10^{-5}$ | $2.0 \times 10^{-5}$ | Butyl propionate |
| Example 18 | 4-Chloro-1,3-dioxolan-2-one | $1.0 \times 10^{-5}$ | $2.0 \times 10^{-5}$ | Ethyl propionate |
| Example 19 | 4-Chloro-1,3-dioxolan-2-one | $1.0 \times 10^{-5}$ | $2.0 \times 10^{-5}$ | Ethyl propionate |
| Example 20 | 4-Chloro-1,3-dioxolan-2-one | $1.0 \times 10^{-5}$ | $2.0 \times 10^{-5}$ | Ethyl propionate |
| Example 21 | 4-Chloro-1,3-dioxolan-2-one | $1.0 \times 10^{-5}$ | $2.0 \times 10^{-5}$ | Ethyl propionate |
| Example 22 | 4-Chloro-1,3-dioxolan-2-one | $1.0 \times 10^{-5}$ | $2.0 \times 10^{-5}$ | Methyl acetate |
| Example 23 | 4-Chloro-1,3-dioxolan-2-one | $1.0 \times 10^{-5}$ | $2.0 \times 10^{-5}$ | Ethyl acetate |
| Example 24 | 4-Chloro-1,3-dioxolan-2-one | $1.0 \times 10^{-5}$ | $2.0 \times 10^{-5}$ | Propyl acetate |
| Example 25 | 4-Chloro-1,3-dioxolan-2-one | $1.0 \times 10^{-5}$ | $2.0 \times 10^{-5}$ | Butyl acetate |
| Example 26 | 4-Chloro-1,3-dioxolan-2-one | $1.0 \times 10^{-5}$ | $2.0 \times 10^{-5}$ | Pentyl acetate |
| Example 27 | 4-Chloro-1,3-dioxolan-2-one | $1.0 \times 10^{-5}$ | $2.0 \times 10^{-5}$ | Ethyl acetate |
| Example 28 | 4-Chloro-1,3-dioxolan-2-one | $1.0 \times 10^{-5}$ | $2.0 \times 10^{-5}$ | Ethyl acetate |
| Example 29 | 4-Chloro-1,3-dioxolan-2-one | $1.0 \times 10^{-5}$ | $2.0 \times 10^{-5}$ | Ethyl acetate |
| Example 30 | 4-Chloro-1,3-dioxolan-2-one | $1.0 \times 10^{-5}$ | $2.0 \times 10^{-5}$ | Ethyl acetate |
| Example 31 | 4-Chloro-1,3-dioxolan-2-one | $1.0 \times 10^{-5}$ | $2.0 \times 10^{-5}$ | Butyl butyrate |
| Example 32 | 4-Chloro-1,3-dioxolan-2-one | $1.0 \times 10^{-5}$ | $2.0 \times 10^{-5}$ | Ethyl valerate |
| Example 33 | 4-Chloro-1,3-dioxolan-2-one | $1.0 \times 10^{-5}$ | $2.0 \times 10^{-5}$ | Ethyl pivalate |
| Example 34 | 4-Chloro-1,3-dioxolan-2-one | $1.0 \times 10^{-5}$ | $2.0 \times 10^{-5}$ | Ethyl propionate |
| Example 35 | 4-Chloro-1,3-dioxolan-2-one | $1.0 \times 10^{-5}$ | $2.0 \times 10^{-5}$ | Ethyl propionate |
| Comparative Example 1 | — | — | — | Ethyl propionate |
| Comparative Example 2 | 4-Chloro-1,3-dioxolan-2-one | $1.0 \times 10^{-5}$ | $2.0 \times 10^{-5}$ | — |
| Comparative Example 3 | 4-Chloro-1,3-dioxolan-2-one | $1.0 \times 10^{-5}$ | $2.0 \times 10^{-5}$ | — |
| Comparative Example 4 | — | — | — | Ethyl propionate |
| Comparative Example 5 | — | — | — | Ethyl propionate |

| | Electrolyte Ratio [vol %] | Positive electrode Lithium vanadium compound | 5 C rate retention rate [%] |
|---|---|---|---|
| Example 1 | EC:X = 20:80 | $LiVOPO_4$ | 70 |
| Example 2 | EC:X = 20:80 | $LiVOPO_4$ | 71 |
| Example 3 | EC:X = 20:80 | $LiVOPO_4$ | 70 |
| Example 4 | EC:X = 20:80 | $LiVOPO_4$ | 70 |
| Example 5 | EC:X = 20:80 | $LiVOPO_4$ | 60 |
| Example 6 | EC:X = 20:80 | $LiVOPO_4$ | 70 |
| Example 7 | EC:X = 20:80 | $LiVOPO_4$ | 71 |
| Example 8 | EC:X = 20:80 | $LiVOPO_4$ | 70 |
| Example 9 | EC:X = 20:80 | $LiVOPO_4$ | 52 |
| Example 10 | EC:X = 20:80 | $LiVOPO_4$ | 53 |
| Example 11 | EC:X = 20:80 | $LiVOPO_4$ | 52 |
| Example 12 | EC:X = 20:80 | $LiVOPO_4$ | 52 |
| Example 13 | EC:X = 20:80 | $LiVOPO_4$ | 52 |
| Example 14 | EC:X = 20:80 | $LiVOPO_4$ | 51 |
| Example 15 | EC:X = 20:80 | $LiVOPO_4$ | 70 |
| Example 16 | EC:X = 20:80 | $LiVOPO_4$ | 70 |
| Example 17 | EC:X = 20:80 | $LiVOPO_4$ | 66 |
| Example 18 | EC:X = 26:74 | $LiVOPO_4$ | 66 |
| Example 19 | EC:X = 25:75 | $LiVOPO_4$ | 70 |
| Example 20 | EC:X = 5:95 | $LiVOPO_4$ | 70 |
| Example 21 | EC:X = 4:96 | $LiVOPO_4$ | 66 |
| Example 22 | EC:X = 30:70 | $LiVOPO_4$ | 70 |
| Example 23 | EC:X = 30:70 | $LiVOPO_4$ | 71 |
| Example 24 | EC:X = 30:70 | $LiVOPO_4$ | 71 |
| Example 25 | EC:X = 30:70 | $LiVOPO_4$ | 70 |
| Example 26 | EC:X = 30:70 | $LiVOPO_4$ | 66 |
| Example 27 | EC:X = 26:74 | $LiVOPO_4$ | 65 |
| Example 28 | EC:X = 25:75 | $LiVOPO_4$ | 71 |
| Example 29 | EC:X = 5:95 | $LiVOPO_4$ | 70 |
| Example 30 | EC:X = 4:96 | $LiVOPO_4$ | 65 |
| Example 31 | EC:X = 30:70 | $LiVOPO_4$ | 60 |
| Example 32 | EC:X = 30:70 | $LiVOPO_4$ | 60 |
| Example 33 | EC:X = 30:70 | $LiVOPO_4$ | 59 |
| Example 34 | EC:X = 30:70 | $LiVPO_4$ | 67 |
| Example 35 | EC:X = 30:70 | $Li_3V_2(PO4)_3$ | 67 |
| Comparative Example 1 | EC:X = 30:70 | $LiVOPO_4$ | 35 |
| Comparative Example 2 | EC:DEC = 30:70 | $LiVOPO_4$ | 33 |
| Comparative Example 3 | EC:EMC = 30:70 | $LiVOPO_4$ | 36 |

TABLE 1-continued

| | | | |
|---|---|---|---|
| Comparative Example 4 | EC:X = 30:70 | LiVPO$_4$ | 42 |
| Comparative Example 5 | EC:X = 30:70 | Li$_3$V$_2$(PO4)$_3$ | 41 |

INDUSTRIAL APPLICABILITY

The present invention provides a non-aqueous electrolyte for a lithium ion secondary battery capable of improving rate characteristics, and the lithium ion secondary battery using the same.

LIST OF REFERENCE NUMERALS

10 Positive electrode
12 Positive electrode current collector
14 Positive electrode active material layer
18 Separator
20 Negative electrode
22 Negative electrode current collector
24 Negative electrode active material layer
30 Stacked body
50 Case
60, 62 Lead
100 Lithium ion secondary battery

The invention claimed is:

1. A non-aqueous electrolyte for a lithium ion secondary battery, comprising a carboxylic acid ester and $2.0 \times 10^{-6}$ to $3.0 \times 10^{-3}$ mol/L of halide ion other than fluoride ion.

2. The non-aqueous electrolyte for the lithium ion secondary battery according to claim 1, further comprising a halogenated cyclic carbonate represented by the following chemical formula (1)
    (where X$_1$ and X$_2$ represent halogen excluding fluorine or hydrogen, provided that one of X$_1$ and X$_2$ is halogen excluding fluorine)

[Chemical formula 1]

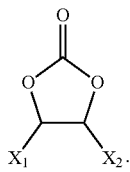

(1)

3. The non-aqueous electrolyte for the lithium ion secondary battery according to claim 2, wherein the electrolyte comprises $1.0 \times 10^{-6}$ to $3.0 \times 10^{-3}$ mol/L of the halogenated cyclic carbonate.

4. The non-aqueous electrolyte for the lithium ion secondary battery according to claim 1, wherein the carboxylic acid ester is represented by the following chemical formula (2)

(where R$_1$ and R$_2$ each represents a linear or branched alkyl group or a substituted alkyl group having 1 to 4 carbon atoms, and a total number of carbon atoms of R$_1$ and R$_2$ is 5 or less)

[Chemical formula 2]

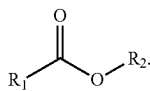

(2)

5. The non-aqueous electrolyte for the lithium ion secondary battery according to claim 1, wherein the carboxylic acid ester is propionic acid ester or acetic acid ester.

6. The non-aqueous electrolyte for the lithium ion secondary battery according to claim 1, wherein the halide ion other than the fluoride ion is a chloride ion.

7. A lithium ion secondary battery comprising:
    a positive electrode;
    a negative electrode;
    a separator positioned between the positive electrode and the negative electrode; and
    the non-aqueous electrolyte for the lithium ion secondary battery according to claim 1.

8. The lithium ion secondary battery according to claim 7, wherein the positive electrode comprises a lithium vanadium compound.

9. The lithium ion secondary battery according to claim 8, wherein the lithium vanadium compound is LiVOPO$_4$.

10. The non-aqueous electrolyte for the lithium ion secondary battery according to claim 2, wherein the halogenated cyclic carbonate is at least one of 4-Chloro-1,3-dioxolan-2-one, 4,5-Dichloro-1,3-dioxolan-2-one, 4-Bromo-1,3-dioxolan-2-one, or 4-Iodo-1,3-dioxolan-2-one.

11. The non-aqueous electrolyte for the lithium ion secondary battery according to claim 5, wherein the carboxylic acid ester is at least one of ethyl propionate, methyl propionate, propyl propionate, butyl propionate, methyl acetate, ethyl acetate, propyl acetate, butyl acetate, pentyl acetate, butyl butylate, ethyl valerate or ethyl pivalate.

12. The non-aqueous electrolyte for the lithium ion secondary battery according to claim 10, wherein the carboxylic acid ester is at least one of ethyl propionate, methyl propionate, propyl propionate, butyl propionate, methyl acetate, ethyl acetate, propyl acetate, butyl acetate, pentyl acetate, butyl butylate, ethyl valerate or ethyl pivalate.

* * * * *